United States Patent [19]

Hofer et al.

[11] Patent Number: 4,885,354

[45] Date of Patent: Dec. 5, 1989

[54] EPOXY RESIN COMPOSITIONS

[75] Inventors: Arnold Hofer, Muttenz; Hans Gempeler, Aesch, both of Switzerland

[73] Assignee: Ciba-Geigy Corporation, Ardsley, N.Y.

[21] Appl. No.: 258,542

[22] Filed: Oct. 17, 1988

[30] Foreign Application Priority Data

Oct. 29, 1987 [CH] Switzerland ............... 4229/87
Jun. 29, 1988 [CH] Switzerland ............... 2472/88

[51] Int. Cl.$^4$ ................................. C08G 59/68
[52] U.S. Cl. ................................. 528/94; 528/99; 252/152.23
[58] Field of Search ................. 528/94; 252/182.23

[56] References Cited

U.S. PATENT DOCUMENTS

| | | |
|---|---|---|
| 3,275,708 | 9/1966 | Bylsma . |
| 4,312,974 | 1/1982 | Chiao ................ 528/94 X |
| 4,465,722 | 8/1984 | Fiaux et al. . |
| 4,474,935 | 10/1984 | Lopez ................ 528/94 X |

*Primary Examiner*—Earl Nielsen
*Attorney, Agent, or Firm*—Luther A. R. Hall

[57] ABSTRACT

An epoxy resin composition comprising an epoxy resin that is liquid at room temperature and containing on average more than one epoxy group per molecule and a quarternary piperidinium salt as advancement catalyst.

When advanced with compounds having two phenolic hydroxyl groups, such compositions give excellent products of low viscosity which are suitable, for example, for use in powder coating compositions.

10 Claims, No Drawings

EPOXY RESIN COMPOSITIONS

The present invention relates to epoxy resin compositions which can be advanced in the presence of piperidinium salts, and to the use of said salts as advancement catalysts for epoxy resins.

By the advancement of epoxy resins is generally meant a chain lengthening and, associated therewith, an increase in the molecular weight of epoxy resins. A particular factor in advancement is the selectivity of the catalyst employed, which is intended to ensure the formation of linear polyhydroxy ethers.

Along with their selectivity, advancement catalysts should be sufficiently reactive to permit the formation of linear, solid, advanced epoxy resins of higher molecular weight at an economically better rate. Owing to the opening of the epoxide ring, high reaction rates are accompanied by strong evolution of heat, and the heat evolved can be used for heating the reaction mixture.

Many compounds have been proposed or disclosed as catalysts for the advancement of liquid epoxy resins. Some of these compounds, however, are not selective and give rise to the aforementioned branching or crosslinking. Others are in turn ineffective in promoting the strongly exothermic advancement reactions for producing a satisfactorily advanced linear, solid epoxy resin at a useful rate.

Examples of known advancement catalysts are tetraalkylammonium hydroxides or tetraalkylammonium halides (q.v. U.S. Pat. No. 4,465,722). In addition, piperidine has been proposed as advancement catalyst in U.S. Pat. No. 3,275,708.

The advanced epoxy resins prepared by known processes, however, do not meet all of the high requirements which are at the present time made of such compounds. It is therefore the object of the present invention to provide advanced epoxy resins which are of low viscosity, high temperature resistance and high linearity, and which can be prepared in the presence of relatively small amounts of an advancement catalyst.

Accordingly, the present invention relates to epoxy resin compositions comprising an epoxy resin that is liquid at room temperature and contains on average more than one epoxy group per molecule and a quaternary piperidinium salt.

Suitable epoxy compounds are, in particular, those whose molecular weight is relatively low, for example lower than 3500, in particular lower than 2000, and is preferably from 175 to 350. The diglycidyl compounds preferably used may be ethers or esters, and the glycidyl groups can also be linked to nitrogen atoms. Examples of phenols on which the ethers are based are typically: mononuclear diphenols (such as resorcinol), naphthalenes having two hydroxyl groups such as 1,4-dihydroxynaphthalene, biphenyls and other binuclear aromatic compounds that carry a methylene, isopropylidene, O, $SO_2$ or S bridge and contain two hydroxyl groups attached to the aromatic nuclei, for example preferably bisphenol A, bisphenol F or bisphenol S. The benzene nuclei can also contain halogen atoms, for example tetrabromobisphenol A. Aliphatic dihydroxy compounds are also suitable, for example 1,4-butanediol or polyether glycol. The glycidyl esters are based, for example, on phthalic acid, terephthalic acid, tetrahydrophthalic acid, hexahydrophthalic acid, adipic acid, trimethyladipic acid or sebacic acid. Also suitable are mononuclear hydantoins carrying glycidyl groups at the nitrogen atoms, for example N,N'-diglycidyl hydantoins. Other glycidyl compounds of nitrogen-containing rings are those of 5,6-dihydrouracils or barbituric acids.

These compounds are known and most are commercially available.

The catalysts employed in this invention are, for example, piperidiniumsalts of formula I

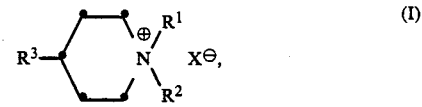

wherein $R^1$ is $C_1$–$C_8$alkyl and $R^2$ is $C_1$–$C_8$alkyl, $C_1$–$C_8$-hydroxyalkyl, $C_1$–$C_8$-alkoxyalkyl, $C_1$–$C_8$alkoxyhydroxyalkyl, $C_1$–$C_8$alkenyl, $C_1$–$C_8$alkoxycarbonylalkyl, $C_1$–$C_8$alkylcarbonylalkyl, $C_7$–$C_9$phenylalkyl or $C_7$–$C_9$-phenylhydroxyalkyl, $R^3$ is hydrogen or hydroxy, and X is halogen or acetate.

Suitable piperidinium salts are preferably those of formula Ib

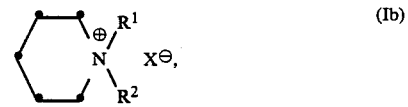

wherein $R^1$ is $C_1$–$C_8$alkyl and $R^2$ is $C_1$–$C_8$alkyl, $C_1$–$C_8$-hydroxyalkyl or benzyl, and X is halogen or acetate.

$C_1$–$C_8$Alkyl, preferably $C_1$–$C_4$alkyl, radicals are suitably methyl, ethyl, n-propyl, n-butyl, n-hexyl or n-octyl. These radicals may carry a hydroxyl group, especially in 2-position (if present). Preferably $R^1$ is methyl or ethyl and $R^2$ is ethyl.

$C_1$–$C_8$Alkoxyhydroxyalkyl radicals are radicals that contain an ether function as well as a hydroxy group, for example (2-hydroxy-3-butoxy)propyl.

$R^2$ as alkenyl may be, for example, allyl or methallyl.

Further examples of $R^2$ are acetonyl, acetoxyethyl or (2-hydroxy-2-phenyl)ethyl.

X as a halogen atom is preferably I, Br or Cl, most preferably I.

The compounds of formula I are known and can be prepared in known manner, for example by reacting a piperidine of formula II

with a compound of formula III $R_2$—X. Reference is made in this connection to the Examples.

The piperidinium salt to be used in this invention is used in catalytically effective amounts, for example in an amount of about 2 to 2000, preferably 10 to 700 and, most preferably, 30 to 500 ppm, based on the weight of the basic resin.

The advancement process is commonly carried out, for example, by reacting the epoxy resin with compounds that preferably contain two phenolic hydroxyl groups.

All aromatic compounds which have preferably two phenolic hydroxyl groups and are known in the advancement method can be used as starting materials. Representative examples are: mononuclear diphenols (such as resorcinol), naphthalenes having two hydroxyl groups, for example 1,4-dihydroxynaphthalene, biphenyls and other binuclear aromatic compounds carrying a methylene, isopropylidene, O, $SO_2$ or S bridge and containing two hydroxyl groups attached to the aromatic nuclei, in particular bisphenol A, bisphenol F or bisphenol S. The benzene nuclei can also contain halogen atoms, for example tetrabromobisphenol A.

The amount of phenol depends on the type of product desired. The larger the amount, the higher in general the molecular weight of the final product will be. The melting point will also rise, and the physical and chemical properties of the resin obtained will change.

Avancement processes and the manner in which they are carried out are known and disclosed, for example, in U.S. Pat. Nos. 3,275,708 and 4,465,722.

The reaction is carried out in the temperature range from 100°–200° C., preferably from 120°–190° C., and under a pressure of 10–1000 mbar, preferably 200–800 mbar.

The advanced epoxy resins so obtained are distinguished by high stability of the epoxy value and of the viscosity after exposure to heat. In addition, these resins have a low viscosity suitable for further processing. It has been found that the advancement catalysts to be used in the practice of this invention have a constant activity in the reaction and, because of their high selectivity, result in exceedingly linear products. Further, the use of a chain terminator can be dispensed with. If desired, the use of a monofunctional chain terminator, for example a phenol, is also suitable for carrying out the advancement in optimum manner. The catalysts are effective in relatively small amounts, the reaction proceeds rapidly, and only an insignificant tendency to undesired phenol cleavage is observed. This feature can be seen in the good colour properties of the products.

The cured final products (prepared by crosslinked with conventional hardeners for epoxy resins, for example acid anhydrides, polyamines, polyhydric phenols and the like) have good flexibility.

The products can be used for surface protection, for the production of castings, especially in the electrical field, of prepregs and laminates. Their use for the production of solid resins as binders for powder coating compositions, of water-soluble primers (for example for car bodies) and of can and tube varnishes, merits particular mention.

EXAMPLE 1

N-Methyl-N-benzylpiperidinium chloride

In a 1000 ml sulfonating flask, the following substances are mixed in the same order:
99.2 g (1.0 mol) of N-methylpiperidine
200 ml of methyl ethyl ketone (MEK),
126.6 g (1.0 mol) of benzyl chloride.

With stirring, the reaction mixture is heated to reflux temperature (ca. 83° C.) and after a time becomes turbid. After a reaction time of 7 hours the crystalline slurry is filtered, and the filter product is washed with MEK and dried under vacuum. The filtrate is also reacted for 7 hours and the filter residue is treated in the same manner. Yield: 199 g≙88%. Melting point: 248° C.

EXAMPLE 2

N-Methyl-N-butylpiperidinium bromide

In a 1000 ml ground flask the following substances are mixed in similar manner and reacted:
24.8 ml (0.2 mol) of N-methylpiperidine,
50.0 ml of MEK,
21.8 ml (0.2 mol) of 1-butyl bromide.

The flask is heated on a rotary evaporated for 6 hours to ca. 65° C. and the precipitated product is then filtered with suction. The filtrate is stirred for a further 2 hours at 65° C. and the precipitate is filtered with suction. The filter residue is washed with small amount of MEK and dried. Yield: 31.7 g≙67%. Melting point: 241° C.

EXAMPLE 3

N-Methyl-N-ethylpiperidinium iodide

In accordance with Example 2, the following substances are mixed in a ground flask:
40.7 ml (0.5 mol) of ethyl iodide,
180 ml of methyl ethyl ketone,
62.0 ml (0.5 mol) of N-methylpiperidine.

After a reaction time of ca. 4 hours the precipitate is filtered with suction, washed briefly and dried. Yield: 119 g≙93%. Melting point: 304° C.

EXAMPLE 4

N,N-Dimethylpiperidinium chloride

In a glass autoclave of ca. 850 ml capacity, the following components are reacted under pressure up to 4 bar:
70.0 g (≙0.7 mol) of methyl piperidine,
300 ml of methyl ethyl ketone,
38.5 g (≙0.7 mol) of methyl chloride (with excess).

After ca. 4 hours at a maximum temperature of 90° C. the reaction is complete. After filtration, washing with MEK and drying, the yield is 98 g≙90%. Melting point: 315° C. (dec).

EXAMPLE 5

N,N-Diethylpiperidinium iodide

The following components are mixed in a ground glass flask as in Example 2:
16.2 ml (0.2 mol) of ethyl iodide,
50 ml of methyl isobutyl ketone,
28.2 ml (0.2 mol) of N-ethylpiperidine.

After a reaction time of ca. 4 hours at 60° C. (rotary evaporator), in the course of which time a further 70 ml of MIBK are added to dilute the mixture, the reaction mixture is filtered with suction. The filter cake is washed and immediately placed in a vacuum drier. The yield is 46.9 g≙87%. Melting point: 271° C.

EXAMPLE 6

N-Methyl-N-ethylpiperidinium acetate

Preparation of a quat in acetate form from the corresponding iodide by halide precipitation. Each of the following two substances is dissolved in 300 ml of water:
lead acetate trihydrate: 38.1 g≙0.2 mol
ethyl methylpiperidinium iodide: 51.2 g≙0.2 mol.

This precipitation is effected at room temperature.

The precipitated lead iodide can be readily isolated in a coarse folded filter, while traces of lead ions in the filtrate are removed by additional precipitation with a dilute solution of ammonium bicarbonate. After clarifying filtration, the resultant solution of the quat acetate is concentrated by evaporation on a rotary evaporator in a tared ground glass flask. The product so obtained, a semi-fluid crystalline slurry, melts at 30°–34° C. The yield is 35.1 g≙95%.

EXAMPLE 7

N-Ethyl-N-butylpiperidinium iodide

The following components are mixed in a ground glass flask as in Example 2 and reacted for 4 hours at 50° C.:
23.2 ml (0.2 mol) of butyl iodide,
50 ml (+50 ml) of methyl ethyl ketone,
28.0 ml (0.2 mol) of N-ethylpiperidine.

The reaction product forms a dense crystalline slurry which, in the course of the reaction, has to be diluted with a further 50 ml of methyl ethyl ketone so that it can be homogenised by the rotary motion and also subsequently filtered with suction. The filter cake is washed on the filter and then given a further wash with a small amount of methyl ketone, filtered again and dried in a vacuum drier. Yield: 42.4 g≙71%. Melting point: 226° C.

EXAMPLE 8

N-Methyl-N-hydroxyethylpiperidinium acetate

In a small autoclave of ca. 900 ml capacity, the following components are reacted under pressure up to 2.0 bar abs. and in the temperature range of 20°–29° C.:
50 g (0.5 mol) of N-methylpiperidine,
30 g (0.5 mol) of glacial acetic acid,
150 ml of methyl ethyl ketone,
22 g (0.5 mol) of ethylene oxide.

After a reaction time of 5 hours, the reaction mixture, which consists of two liquid phases, is concentrated on a rotary evaporator until there is no further distillation of volatile constituents. The residue is taken up in 70 ml of butanol and completely concentrated under vacuum. The non-volatile and non-crystallisable product is processed as a 50% solution in butanol for the chain advancement experiments. The yield is: 94.1 g≙92%. $n_{25}^D = 1.479$.

EXAMPLE 9

N-Methyl-N-2-hydroxypropylpiperidinium acetate

In a flask equipped with water bath and reflux condenser, the following components are reacted in accordance with Example 8 for 10 hours under reflux and normal pressure:
24.8 ml (0.2 mol) of N-methylpiperidine,
11.4 ml (0.2 mol) of 100% acetic acid,
30 ml of methyl ethyl ketone,
21.2 ml (0.3 mol) of propylene oxide.

Working up is effected in the same manner as in the preceding Example. This reaction product too is processed as a 50% solution in butanol and, if required, can be further diluted. The yield is 40.3 g≙93%. $n_{25}^D = 1.480$.

EXAMPLE 10

N-Methyl-N-2-hydroxbutylpiperidinium acetate

In a flask equipped with water bath and reflux condenser, the following components are reacted as in Example 8 for 9 hours under reflux and normal pressure:
24.8 ml (0.2 mol) of N-methylpiperidine,
11.4 ml (0.2 mol) of 100 acetic acid,
20 ml of methyl ethyl ketone,
17.7 ml (0.2 mol) of butylene-1-oxide.

Working up is effected in the same manner as in Example 8 for the quaternisation product with ethylene oxide. In this Example too the reaction product is purified by distillation/stripping and processed as a 50% solution in butanol. The yield is 36.1 g≙78%. $n_{25}^D = 1.476$.

EXAMPLE 11

N-Methyallyl-N-methylpiperidinium chloride

The following components are mixed in a ground glass flask as in Example 7 and reacted for 7 hours on a water bath at 55° C.:
18.1 g (0.2 mol) of methallyl chloride,
80 g of methyl ethyl ketone,
19.8 g (0.2 mol) of N-methylpiperidine.

The crystalline slurry is filtered with suction and the filter cake is washed with a small amount of ketone and dried under vacuum. The yield is 19.9 g≙53%. Melting point: 209° C.

EXAMPLE 12

N-Acetonyl-N-methylpiperidinium chloride

In the same manner as in Example 7, the following components are reacted for 9 hours at 60° C.:
18.5 g (0.5 mol) of chloroacetone,
80 g of methyl ethyl ketone,
19.8 g (0.2 mol) of N-methylpiperidine.

The crystalline slurry is filtered with suction and the filter cake is washed with methyl ethyl ketone and dried under vacuum. Yield: 26.0 g≙68%. Melting point: 130° C.

EXAMPLE 13

N-(2-Hydroxy-3-butoxy)propyl-N-methylpiperidinium acetate

In accordance with Example 9, the following components are mixed in a ground glass flask and reacted for 13 hours at 60° C.:
19.8 g (0.2 mol) of N-methylpiperidine,
20 g of methyl isobutyl ketone (MIBK),
12.0 g (0.2 mol) of acetic acid,
26.0 g (0.2 mol) of butyl glycidyl ether.

Working up is effected as in Example 9 by vacuum distillation and dilution with butanol to give a 50% solution. Yield: 51.2 g≙89%. Refractive index $n_{25}^D = 1.473$.

EXAMPLE 14

N-acetoxyethyl-N-methylpiperidinium bromide

In accordance with Example 7, the following components are reacted for 6 hours at 60° C. in a ground glass flask:
33.5 g (0.2 mol) of ethyl bromoacetate,
80 g of methyl ethyl ketone,
19.8 g (0.2 mol) of N-methylpiperidine.

The crystalline slurry is filtered with suction and the filter cake is washed and dried in a vacuum drier. Yield: 47.2 g≙89%. Melting point: 202° C.

EXAMPLE 15

N-Ethyl-N-methyl-4-hydroxypiperidinium iodide

As in the preceeding Example, the following components are reacted for 6 hours at 60° C. in a ground glass flask on a water bath:
23 g (0.2 mol) of 1-methyl-4-hydroxypiperidine,
120 g of methyl isobutyl ketone (MIBK)
31.2 g (0.2 mol) of ethyl iodide.

The voluminous crystalline slurry is filtered with suction and the filter cake is washed and dried under vacuum. Yield: 44.4 g=79%. Melting point: 266° C.

EXAMPLE 16

N-(2-Hydroxy-2-phenyl)ethyl-N-methylpiperidinium acetate

In accordance with Examples 9 and 13, the following components are reacted for 14 hours at 70° C. on a water bath:
19.8 g (0.2 mol) of N-methylpiperidine,
30 g of methyl isobutyl ketone,
12.0 g (0.2 mol) of acetic acid,
24.0 g (0.2 mol) of styrene oxide.

After concentration of the reaction mixture by vacuum distillation and simultaneous stripping in a stream of air the product is weighed. The yield is 51.0=91% with a refractive index $n_{25}^D=1.521$. A 50% solution of this product in butanol is prepared.

ADVANCEMENT—REACTIONS WITH BIS-A-DIEPOXY/BIS-A

EXAMPLE 17

With stirring, 845 g of basic resin (bisphenol A diglycidyl ether) having an epoxy value of 5.4 eq/kg are heated in a polymer flask and mixed at 100° C. with a first portion of bisphenol A (217 g). Then a butanolic solution of ethyl methylpiperidinium iodide (Example 3) is added as catalyst, the concentration being 300 ppm≙1.2 mmol/kg, based on the basic resin. Simultaneously the temperature is raised with constant stirring. At 170° C. the second portion of bisphenol A (217 g) is added, after which addition the temperature is kept constant at 180° C. After 3–4 hours the epoxy number of the reaction mixture has reached 0.60 eq/kg (control by titration), so that the resin melt can be discharged, cooled and comminuted. The viscosities of this resin (measured in butyl carbitol at a solids content of 40% at 25° C. in a Hoeppler viscosimeter) are 2200 mPa.s for the blank value compared with 2950 mPa.s after subjecting the pure resin to a heat stability test for 4 hours at 180° C.

EXAMPLE 18

The procedure of Example 17 is repeated, using a butanolic solution of methylbutylpiperidinium bromide (Example 2) as catalyst in a concentration of 150 ppm≙0.64 mmol/kg, based on the basic resin. The viscosities of this resin under the same conditions are 2200 mPa.s and 3250 mPa.s.

EXAMPLE 19

The procedure of Example 17 is repeated, using a butanolic solution of N,N-dimethylpiperidinium chloride (Example 4) as catalyst in a concentration of 150 ppm≙1.0 mmol/kg. The viscosities of this resin under the same conditions are 2650 mPa.s and 3630 mPa.s.

EXAMPLE 20

With stirring, 845 g of the basic resin (bisphenol A diglycidyl ether) having an epoxy value of 5.4 eq/kg are mixed with a methanolic solution of methylbenzylpiperidinium chloride (Example 1) as catalyst in a polymer flask, such that the concentration of catalyst is 400 ppm≙1.8 mmol/kg, based on the basic resin. Simultaneously the temperature is raised to 100° C., with stirring, and the first portion of bisphenol A (217 g) is added to the mixture of the basic resin and catalyst and dissolved by stirring. The mixture is further heated to 170° C. and the second portion of 217 g of bisphenol A is added. At 180° C. the temperature is kept constant under a partial vacuum of 500 mbar, and after 3–4 hours the desired epoxy number is attained (control by epoxy titration), so that the resin melt can be discharged, cooled and comminuted. The viscosities of this resin (40% in butyl carbitol at 25° C.) are 1180 mPa.s for the blank value, compared with 3560 mPa.s after a heat treatment for 4 hours at 180° C.

EXAMPLE 21

The procedure of Example 17 is repeated, using methylethylpiperidinium acetate (Example 6) as catalyst in a concentration of 200 ppm≙1.1 mmol/kg. The respective viscosities in this case are 2250 and 3430 mPa.s.

EXAMPLE 22

The procedure of Example 17 is repeated, using a butanolic solution of diethylpiperidinium iodide (Example 5) as catalyst in a concentration of 300 ppm≙1.1 mmol/kg. The viscosities of this resin under the same conditions are 2060 and 2770 mPa.s.

EXAMPLE 23

The procedure of Example 22 is repeated, using ethylbutylpiperidinium iodide (Example 7) as catalyst in a concentration of 200 ppm≙0.67 mmol/kg. The viscosities of this resin under the same conditions are 2070 and 3160 mPa.s.

EXAMPLE 24

The procedure of Example 17 is repeated, using methyl-2-hydroxyethylpiperidinium acetate (Example 8) as catalyst in a concentration of 400 ppm≙2.0 mmol/kg. The viscosities of this resin under the same conditions are 2080 and 3350 mPa.s.

EXAMPLE 25

The procedure of Example 17 is repeated, using methyl-2-hydroxypropylpiperidinium acetate (Example 9) as catalyst in a concentration of 450 ppm≙2.1 mmol/kg. The viscosities of this resin under the same conditions are 2140 and 3500 mPa.s.

EXAMPLE 26

The procedure of Example 17 is repeated, using methyl-2-hydroxybutylpiperidinium acetate (Example 10) as catalyst in a concentration of 400 ppm≙1.73 mmol/kg. The viscosities of this resin under the same conditions are 2040 and 3140 mPa.s.

EXAMPLE 27

The procedure of Example 17 is repeated, using N-methallyl-N-methylpiperidinium chloride (Example 11) as catalyst in a concentration of 400 ppm≙2.1 mmol/kg. The two characteristic viscosities of this resin under identical conditions are 2210 and 3160 mPa.s.

EXAMPLE 28

The procedure of Example 17 is repeated, using N-acetonyl-N-methylpiperidinium chloride (Example 12) as catalyst in a concentration of 700 ppm≙3.6 mmol/kg. The two characteristic viscosities of the resultant resin under identical conditions are 2210 and 3100 mPa.s.

EXAMPLE 29

The procedure of Example 17 is repeated, using a butanolic solution of N-(2-hydroxy-3-butoxy)propyl-N-methylpiperidinium acetate (Example 12) as catalyst in a concentration of 700 ppm≙2.45 mmol/kg. The two characteristics viscosities under identical conditions are 2300 and 3840 mPa.s.

EXAMPLE 30

The procedure of Example 20 is repeated, using a methanolic solution of N-acetoxyethyl-N-methylpiperidinium bromide (Example 14) as catalyst in a concentration of 100 ppm≙3.8 mmol/kg of basic resin. After a reaction time of ca. 3–5 hours the reaction is discontinued. The viscosities are 2020 and 3060 mPa.s.

EXAMPLE 31

The procedure of Example 17 is repeated, using N-ethyl-N-methyl-4-hydroxypiperidinium iodide (Example 15) as catalyst in a concentration of 500 ppm≙2.2 mmol/kg of basic resin. The viscosities are 1920 and 2570 mPa.s.

EXAMPLE 32

The procedure of Example 17 is repeated, using N-(2-hydroxy-2-phenyl)ethyl-N-methylpiperidinium acetate (Example 16) as catalyst in a concentration of 750 ppm≙2.7 mmol/kg of basic resin. The viscosities are 2320 and 3420 mPa.s.

What is claimed is:

1. An epoxy resin composition comprising an epoxy resin that is liquid at room temperature and containing on average more than one epoxy group per molecule and a catalytically effective amount of a quaternary piperidinium salt as advancement catalyst.

2. An epoxy resin composition according to claim 1, containing diglycidyl compounds having a molecular weight below 3500.

3. An epoxy resin composition according to claim 1, containing a piperidinium salt of formula I

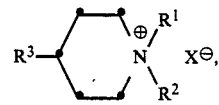

wherein $R^1$ is $C_1$–$C_8$alkyl and $R^2$ is $C_1$–$C_8$alkyl, $C_1$–$C_8$-hydroxyalkyl, $C_1$–$C_8$-alkoxyalkyl, $C_1$–$C_8$alkoxyhydroxyalkyl, $C_1$–$C_8$alkenyl, $C_1$–$C_8$alkoxycarbonylalkyl, $C_1$–$C_8$alkylcarbonylalkyl, $C_7$–$C_9$phenylalkyl or $C_7$–$C_9$-phenylhydroxyalkyl, $R^3$ is hydrogen or hydroxy, and X is halogen or acetate.

4. An epoxy resin composition according to claim 1, containing a piperidinium salt of formula Ib

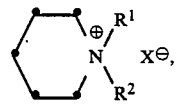

wherein $R^1$ is $C_1$–$C_8$alkyl and $R^2$ is $C_1$–$C_8$alkyl, $C_1$–$C_8$-hydroxyalkyl or benzyl, and X is halogen or acetate.

5. An epoxy resin composition according to claim 3, containing a piperidinium salt of formula I, wherein $R^1$ is methyl or ethyl and $R^2$ is ethyl.

6. An epoxy resin composition according to claim 3, containing a piperidinium salt of formula I, wherein X is iodine.

7. An epoxy resin composition according to claim 1, additionally containing a compound having two phenolic hydroxyl groups.

8. A method of advancing epoxy resins which comprises incorporating a catalytically effective amount of a quaternary piperidinium salt as advancement catalyst into a composition comprising an epoxy resin and a polyhydric phenol.

9. A method according to claim 8 wherein the catalyst is a quaternary piperidinium salt of formula I

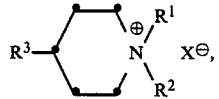

wherein $R^1$ is $C_1$–$C_8$alkyl and $R^2$ is $C_1$–$C_8$alkyl, $C_1$–$C_8$-hydroxyalkyl, $C_1$–$C_8$-alkoxyalkyl, $C_1$–$C_8$alkoxyhydroxyalkyl, $C_1$–$C_8$alkenyl, $C_1$–$C_8$alkoxycarbonylalkyl, $C_1$–$C_8$alkylcarbonylalkyl, $C_7$–$C_9$phenylalkyl or $C_7$–$C_9$-phenylhydroxyalkyl, $R^3$ is hydrogen or hydroxy, and X is halogen or acetate.

10. A method according to claim 9 where in the piperidinium salt of formula I, $R^1$ is methyl or ethyl, and $R^2$ is ethyl.

* * * * *